2,830,032

CROSS-LINKED COPOLYMERS OF A POLYMERIZABLE MONOMER WITH AN UNSATURATED COPOLYMER OF A VINYL ETHER AND VINYL ALLYL ETHER AND PROCESS FOR MAKING SAME

Hans Peter Siebel, Ludwigshafen (Rhine)-Oppau, Germany, assignor to Badische Anilin- & Soda-Fabrik Aktiengesellschaft, Ludwigshafen (Rhine), Germany No Drawing. Application September 28, 1954
Serial No. 458,956

Claims priority, application Germany January 15, 1954

13 Claims. (Cl. 260—45.5)

This invention relates to cross-linked copolymers obtained by the copolymerization of a polymerizable monomer with an unsaturated copolymer of a vinyl ether with an unsaturated ether containing a vinyl ether group and an allyl ether, said unsaturated copolymer still containing unpolymerized allyl groups. The invention further deals with processes for the production of said cross-linked copolymers and with molded articles obtained by carrying out the polymerization in molds.

In the copending application Ser. No. 449,004 filed on August 10, 1954 by Karl Herrle, Hans Fikentscher and myself copolymers and a process for the production of copolymers have been described according to which mixtures of 20 to 99.9 parts by weight of a vinyl ether with only one olefinic double linkage and 80 to 0.1 parts by weight of an unsaturated ether which contains a vinyl group and also an allyl group are copolymerized with the aid of catalysts which initiate cationic ion chain polymerizations. There are thereby formed unsaturated copolymers which contain substantially all the allyl groups in unchanged form.

Among simple vinyl ethers having only one olefinic double linkage there are used for the process of the copending application Ser. No. 449,004 vinyl alkyl ethers, such as vinyl methyl ether, vinyl ethyl ether, vinyl-n-propyl ether, vinyl isopropyl ether, vinyl-n-butyl ether, vinyl isobutyl ether, vinyl dodecyl ether, vinyl octodecyl ether, and also vinyl cycloalkyl ethers, such as vinyl cyclohexyl ether and vinyl decahydronaphthyl ether (i. e. the vinyl ether of decahydronaphthol), or vinyl aryl ethers, such as vinyl phenyl ether, or vinyl aralkyl ethers, such as vinyl benzyl ether.

Vinyl allyl ether is of special interest for copolymerization with the said simple vinyl ethers. There may, however, also be used for example vinyl-2-methyl-allyl ether and vinyl crotonyl ether and also ethers of polyhydric alcohols which contain not only a vinyl group but also an allyl group. Such ethers are for example the vinyl allyl ethers of ethylene glycol or higher glycols. More than two monomers may also be used for the copolymerization.

Among polymerization catalysts which initiate cationic chain polymerizations, acid aluminum sulfate (the preparation of which is described in U. S. patent specification No. 2,549,921) is especially important. A highly active aluminum sulfate is obtained by treating commercial aluminum sulfate $(Al(SO_4)_3.18H_2O)$ with sulfuric acid. The active component of the catalyst is aluminum hexahydrosulfate of the formula $Al_2(SO_4)_3.3H_2SO_4.7H_2O$. With this catalyst, copolymers of high molecular weight can be prepared even at room temperature and at moderately decreased temperatures, as for example between —20° C. and +20° C. Other suitable catalysts are for example Friedel-Crafts' catalysts, such as boron fluoride, aluminum chloride, aluminum bromide, titanium tetrachloride, tin tetrachloride and the addition products of these halides with water, ethers or other organic oxygen-containing compounds. The polymerization temperatures usually lie between about —110° C. and +100° C. For other details relating to the polymerization with cationic catalysts see C. E. Schildknecht, Vinyl and Related Polymers, John Wiley & Sons, Inc., New York, pages 540–542 (1952).

Copolymers having different degrees of polymerization are obtained depending on the polymerization conditions. Thus at low temperatures the products obtained usually have a higher K-value than those at higher temperatures. The K-value may be varied within wide limits and may lie for example between 10 and 150.

The K-value is a parameter denoting the molecular size of the polymer (see H. Fikentscher, Cellulosechemie 13, 58 (1932)).

The polymerization can be carried out in bulk or in the presence of solvents or diluents and may be continuous or discontinuous. Polymerization in a solvent offers the advantage that heat can be withdrawn better. Suitable solvents are for example hydrocarbons, halogenated hydrocarbons and ethers.

The polymers formed are colorless to brown substances which constitute oily, rubberlike to resinous masses depending on the degree of polymerization and the monomers used. They dissolve in organic solvents and contain double linkages which originate from unpolymerized allyl groups and which can be detected in the usual way, e. g. by titration with iodine monochloride. The fact that the number of double linkages in the copolymers largely corresponds to the percentage of the component containing the allyl group warrants the conclusion that the allyl groups do not participate or, at least, do not substantially participate in the polymerization reaction. It is to their content of double linkages that the said new kind of copolymers owe their reactivity; they can be cross-linked by sulfur and other usual vulcanization agents, by molecular oxygen or by the action of peroxidic catalysts.

I have now found that industrially valuable cross-linked copolymers are obtained by subjecting to polymerizing conditions a mixture of a liquid monoolefinic compound containing the group $CH_2=CR$— wherein R is hydrogen or methyl, called hereinafter "liquid monomer," and an unsaturated copolymer containing substantially all its allyl groups in unchanged form obtained according to the said application Ser. No. 449,004. In this process a copolymerization between the allyl groups of the unsaturated copolymer and the olefinic groups of the liquid monomer compound takes place, whereby cross-linked copolymers are formed. The said mixtures should preferably contain 5 to 90 parts by weight of unsaturated copolymer and 95 to 10 parts by weight of liquid monomer compound.

Suitable liquid monomer compounds for this process are for example styrene and its alkyl derivatives, such as alpha-methylstyrene, vinyl esters, such as vinyl acetate or vinyl propionate, acrylic acid and methacrylic acid and their esters the alcohol radicles in these esters having preferably from 1 to 5 carbon atoms, acrylonitrile, unsaturated ketones, such as vinyl methyl ketone, and the like. Mixtures of these liquid monomer compounds with each other or with other polymerizable compounds may also be used.

The unsaturated copolymer and the liquid monomer compound should preferably constitute a substantially homogeneous mass before the copolymerization. Mixtures in which the unsaturated copolymer is dissolved in the liquid monomer compound are of special interest. In cases when there are used for the second copolymerization liquid monomer compounds which are not stimulated to polymerization during the preparation of the unsaturated copolymer by the catalysts used therefor, these liquid monomer compounds can be used as solvents for the first copolymerization and the resultant solutions of unsaturated copolymer reacted with the unsaturated solvent to form cross-linked copolymers. Thus for example vinyl ethyl ether and vinyl allyl ether can be copolymerized with acid aluminum sulfate in the presence of styrene without the styrene participating in the copolymerization. A solution of the unsaturated copolymer in styrene is obtained and this may be reacted to form a cross-linked copolymer after the addition of benzoyl peroxide.

To initiate the copolymerization of the liquid monomer compound and the unsaturated copolymer, a catalyst can be used which initiates a free-radical polymerization, as for example a peroxide, such as benzoyl peroxide, lauryl peroxide and cyclohexanone peroxide, or an azo compound, such as azo-isobutyronitrile. The copolymerization can also be initiated by heat, light or supersonic waves. As polymerization activators there may be used reducing compounds, such as tertiary amines or metal salts, such as cobaltous naphthenate. The polymerization temperature may vary within wide limits. Temperatures between $-10°$ and $250°$ C., preferably between $10°$ and $150°$ C., are especially of interest. Fillers, plasticizers, pigment dyestuffs, soluble dyestuffs and the like may be added to the mixtures to be polymerized. Among the fillers, fibrous substances, such as glass fibers, asbestos fibers or organic fibrous materials, are of special interest because they improve the mechanical properties of the copolymers.

The copolymerization is preferably carried out in molds at atmospheric or increased pressure, and shaped articles of any desired size and shape can thus be made.

The new copolymers are valuable plastics. They have good mechanical, electrical and thermal properties. By reason of the numerous possibilities of variation as regards the choice of components and the method of preparation, products with a great variety of different properties can be made. Thus when using a strongly unsaturated copolymer a substantial cross-linking is obtained which makes the products hard and brittle, whereas less unsaturated copolymers with smaller possibilities of cross-linking form more elastic and softer substances. The liquid monomer compounds used are also obviously of influence on the hardness of the cross-linked copolymers. Styrene, acrylonitrile and methyl methacrylate form relatively hard copolymers, whereas acrylic esters and vinyl propionate yield softer copolymers. A further influence on the mechanical properties is possible by variation of the molecular weight of the unsaturated copolymer. The products are colorless to pale brown in color. Any desired shade of color can be produced and the mechanical properties can be influenced by the addition of fillers or pigments.

The new copolymers can be used for the production of articles of daily use, packaging materials and materials for use in the electrical industry.

The following examples will further illustrate this invention but the invention is not restricted to these examples. The parts are parts by weight.

*Example 1*

0.5 part of a 1% solution of boron fluoride dihydrate in dioxane is added at 25° C. to a mixture of 70 parts of vinyl ethyl ether and 40 parts of vinyl allyl ether in a reaction vessel provided with a stirrer and a reflux condenser. The polymerization, which commences soon after the addition of the catalyst, is controlled by external cooling so that the temperature does not exceed 40° C. A clear, colorless and sticky copolymer having a K-value of 36 is obtained.

(a) 50 parts of the copolymer thus prepared and 0.2 part of benzoyl peroxide are dissolved in 50 parts of styrene. This mixture is heated in a mold under a pressure of 10 excess atmospheres first for an hour at 90° C. and then for another two hours at 120° C., the unsaturated copolymer and the styrene thus being copolymerized. A white shaped article is formed which can readily be removed from the mold after cooling. It has a good tensile strength with good flexibility and pliability.

(b) 25 parts of the copolymer from vinyl ethyl ether and vinyl allyl ether are intimately mixed with 0.2 part of benzoyl peroxide and 75 parts of styrene. This mixture is heated in a mold for 1.5 hours at 85° C. and then for 3 hours at 120° C. The copolymer formed is white and compared with the product described in paragraph *a* of this example has a greater strength but a smaller, although still good, flexibility.

(c) 12 parts of the copolymer from vinyl ethyl ether and vinyl allyl ether and 0.3 part of cyclohexanone peroxide are dissolved in 88 parts of styrene. The copolymerization is carried out as in paragraph *b* of this example. A white, solid shaped article is obtained which has a good impact bending strength.

*Example 2*

0.8 part of a 1% solution of the addition compound of boron fluoride with diethyl ether in diethyl ether is added at $+5°$ C. to a mixture of 160 parts of vinyl methyl ether and 42 parts of vinyl allyl ether in a reaction vessel provided with a stirrer and reflux condenser. The reaction which commences after the addition of the catalyst is controlled by cooling so that the temperature does not exceed 40° C. A clear, colorless and sticky copolymer with the K-value 29 is obtained.

(a) 75 parts of this copolymer and 0.2 part of benzoyl peroxide are mixed with 25 parts of styrene. This mixture is injected into a mold heated to 120° C. The mass is left in the mold for 30 minutes. After cooling there can be taken out a clear, pale yellow colored shaped article which has a very great flexibility with small strength.

(b) 50 parts of the copolymer from vinyl methyl ether and vinyl allyl ether and 0.4 part of lauroyl peroxide are dissolved in 50 parts of styrene. This mixture is slowly heated to 140° C. in a mold under a pressure of 20 excess atmospheres. A colorless and clear, flexible but rigid shaped article which has a good notch strength is obtained.

(c) 80 parts of the copolymer from vinyl methyl ether and vinyl allyl ether and 0.3 part of benzoyl peroxide are dissolved in 20 parts of styrene and polymerized as described in paragraph *b* of this example. An opaque copolymer is obtained which has greater strength and smaller flexibility than the product prepared according to paragraph *b* of this example.

*Example 3*

0.7 part of a 1% solution of aluminum chloride in methylene chloride is added to a mixture of 100 parts of vinyl isobutyl ether, 42 parts of vinyl allyl ether and 150 parts of methylene chloride in a vessel provided with a stirrer. The reaction temperature is kept between $-20°$ and $-10°$ C. After evaporating off the methylene chloride, there is obtained a clear, colorless and viscous-flowing copolymer which has a K-value of 19.

(a) 75 parts of this copolymer are dissolved in 25 parts of ethyl acrylate and 0.1 part of lauroyl peroxide is added. This mixture is introduced into a mold and slowly heated to 55° C. The mold is kept at this temperature until the mass has become solid. Then it is heated at 100° C. for 2 hours. A colorless, clear and flexible shaped article is formed which is insoluble but swellable in solvents.

(b) 25 parts of the copolymer from vinyl isobutyl ether and vinyl allyl ether and 0.1 part of lauroyl peroxide are dissolved in 75 parts of ethyl acrylate. The polymerization is carried out as described in paragraph *a* of this example. A clear, colorless and flexible copolymer is obtained.

Example 4

50 parts of the copolymer from vinyl ethyl ether and vinyl allyl ether according to Example 1 are dissolved in 50 parts of butyl acrylate and 0.1 part of lauroyl peroxide is added thereto. The polymerization is carried out in a mold at 15 excess atmospheres between 60° and 100° C. A clear, colorless, flexible, non-sticky shaped article is obtained.

Example 5

144 parts of vinyl ethyl ether and 17 parts of vinyl allyl ether are polymerized in a vessel provided with a stirrer by leading in boron fluoride gas. A clear and colorless copolymer is obtained having the K-value 21.

(a) 40 parts of this copolymer and 0.2 part of lauroyl peroxide are dissolved in 60 parts of methyl acrylate. By heating for 2 hours at 20 excess atmospheres at 60° C. and 2 hours at 100° C. there is obtained a clear, colorless, flexible and soft copolymer.

(b) 70 parts of methyl methacrylate, 30 parts of the copolymer from vinyl ethyl ether and vinyl allyl ether and 0.2 part of cyclohexanone peroxide are mixed to a homogeneous, viscous mass. This mixture is polymerized at 90° C. and a colorless, opaque solid plastic is obtained.

Example 6

A mixture of 80 parts of vinyl ethyl ether, 20 parts of vinyl allyl ether and 100 parts of petroleum ether is filled in a reactor fitted with a stirrer mechanism and a reflux condenser and, when the mixture has been cooled donw to 10° C., 0.05 part of an acid aluminum sulfate obtained by heating a mixture of 20 grams of $Al_2(SO_4)_3.18H_2O$ and 6.6 grams of $H_2SO_4$ to 150° C. for 4 hours is added. When the polymerization is complete, the petroleum ether is removed by evaporation in vacuo at from 40° to 50° C. The polymer obtained has a K-value of 81.

(a) When dissolving 35 parts of the polymer so obtained and 0.2 part of cyclohexanone peroxide in 10 parts of acrylonitrile and 65 parts of acrylic acid butyl ester and heating the mixture to 60° C. and then raising the temperature slowly to 100° C. within two hours under pressure, a faintly yellow and transparent copolymer is obtained.

(b) When dissolving 50 parts of the copolymer obtained under (a), 0.5 parts of cyclohexanone peroxide and 0.05 part of cobalt naphthenate in 40 parts of styrene and 10 parts of acrylic acid butyl ester and heating the solution at 50° C. for four hours, a colorless, opaque shape is obtained.

Example 7

A mixture of 60 parts of vinyl ethyl ether, 20 parts of vinyl isobutyl ether, 20 parts of vinyl allyl ether and 120 parts of styrene is filled in a reactor fitted with a stirrer mechanism and a reflux condenser and cooled down therein to 10° C. Then 0.1 part of an acid aluminum sulfate prepared as described in Example 6 is added, when the vinyl ethers undergo copolymerization with the vinyl groups of the vinyl allyl ether, a solution of the copolymer in styrene being obtained. After adding 0.2 part of benzoyl peroxide, the mixture is polymerized as described under (a) of Example 6 with the styrene reacting with the allyl groups of the unsaturated linear copolymer to form a cross-linked copolymer.

What I claim is:

1. A cross-linked copolymer made by free radical polymerization of a mixture of from 10 to 95 parts by weight of a liquid monoolefinic compound containing the group $CH_2=CR-$, wherein R is a member of the group consisting of hydrogen and methyl, and from 90 to 5 parts by weight of an unsaturated copolymer prepared by polymerizing a vinyl ether of a saturated monohydric alcohol and vinyl allyl ether in the presence of a cationic polymerization catalyst, said unsaturated copolymer containing unreacted allyl groups.

2. A cross-linked copolymer made by free radical polymerization of a mixture of from 10 to 95 parts by weight of styrene and from 90 to 5 parts by weight of an unsaturated copolymer prepared by polymerizing a vinyl ether of a saturated monohydric alcohol and vinyl allyl ether in the presence of a cationic polymerization catalyst, said unsaturated copolymer containing unreacted allyl groups.

3. A cross-linked copolymer made by free radical polymerization of a mixture of from 10 to 95 parts by weight of styrene and from 90 to 5 parts by weight of an unsaturated copolymer prepared by polymerizing vinyl methyl ether and vinyl allyl ether in the presence of a cationic polymerization catalyst, said unsaturated copolymer containing unreacted allyl groups.

4. A cross-linked copolymer made by free radical polymerization of a mixture of from 10 to 95 parts by weight of styrene and from 90 to 5 parts by weight of an unsaturated copolymer prepared by polymerizing vinyl alkyl ether and vinyl allyl ether in the presence of a cationic polymerization catalyst, said unsaturated copolymer containing unreacted allyl groups.

5. A cross-linked copolymer made by free radical polymerization of a mixture of from 10 to 95 parts by weight of a lower alkyl acrylate and from 90 to 5 parts by weight of an unsaturated copolymer prepared by polymerizing a vinyl ether of a saturated monohydric alcohol and vinyl allyl ether in the presence of a cationic polymerization catalyst, said unsaturated copolymer containing unreacted allyl groups.

6. A cross-linked copolymer made by free radical polymerization of a mixture of from 10 to 95 parts by weight of acrylic acid methyl ester and from 90 to 10 parts by weight of an unsaturated copolymer prepared by polymerizing vinyl ethyl ether and vinyl allyl ether in the presence of a cationic polymerization catalyst, said unsaturated copolymer containing unreacted allyl groups.

7. A cross-linked copolymer made by free radical polymerization of a mixture of from 10 to 95 parts by weight of acrylic acid ethyl ester and from 90 to 10 parts by weight of an unsaturated copolymer prepared by polymerizing vinyl isobutyl ether and vinyl allyl ether in the presence of a cationic polymerization catalyst, said unsaturated copolymer containing unreacted allyl groups.

8. A cross-linked copolymer made by free radical polymerization of a mixture of from 10 to 95 parts by weight of acrylic acid butyl ester and from 90 to 10 parts by weight of an unsaturated copolymer prepared by polymerizing vinyl ethyl ether and vinyl allyl ether in the presence of a cationic polymerization catalyst, said unsaturated copolymer containing unreacted allyl groups.

9. A cross-linked copolymer made by free radical polymerization of a mixture of from 10 to 95 parts by weight of methacrylic acid methyl ester and from 90 to 5 parts by weight of an unsaturated copolymer prepared by polymerizing a vinyl ether of a saturated monohydric alcohol and vinyl allyl ether in the presence of a cationic polymerization catalyst, said unsaturated copolymer containing unreacted allyl groups.

10. A cross-linked copolymer made by free radical polymerization of a mixture of from 10 to 95 parts by weight of methacrylic acid methyl ester and from 90 to 5 parts by weight of an unsaturated copolymer prepared by polymerizing vinyl ethyl ether and vinyl allyl ether in the presence of a cationic polymerization catalyst, said unsaturated copolymer containing unreacted allyl groups.

11. A process for the production of a cross-linked copolymer which comprises polymerizing in the presence of a free radical polymerization initiator a mixture of from 10 to 95 parts by weight of a liquid monoolefinic compound containing the group $CH_2=CR-$, wherein R is a member of the group consisting of hydrogen and methyl, and from 90 to 5 parts by weight of an unsaturated copolymer prepared by polymerizing a vinyl ether of a saturated monohydric alcohol and vinyl allyl ether in the presence of a cationic polymerization catalyst, said unsaturated copolymer containing unreacted allyl groups.

12. A process for the production of a cross-linked copolymer which comprises dissolving an unsaturated copolymer prepared by polymerizing a vinyl ether of a saturated monohydric alcohol and vinyl allyl ether in the presence of a cationic polymerization catalyst, said unsaturated copolymer containing unreacted allyl groups, in a liquid monoolefinic compound containing the group $CH_2=CR-$, wherein R is a member of the group consisting of a hydrogen and methyl, and polymerizing the obtained solution in the presence of a free radical polymerization initiator.

13. A process for the production of a cross-linked copolymer which comprises polymerizing in the presence of a free radical polymerization initiator a mixture of a compound selected from the class consisting of styrene, acrylic acid nitrile, a lower alkyl acrylate and methacrylic acid methyl ester with an unsaturated copolymer prepared by polymerizing a vinyl ether of a saturated monohydric alcohol and vinyl allyl ether in the presence of a cationic polymerization catalyst, said unsaturated copolymer containing unreacted allyl groups.

References Cited in the file of this patent

UNITED STATES PATENTS

| | | |
|---|---|---|
| 2,273,891 | Pollack et al. | Feb. 24, 1942 |
| 2,318,959 | Muskat et al. | May 11, 1943 |
| 2,518,321 | Hoover | Aug. 8, 1950 |
| 2,643,991 | Tawney | June 30, 1953 |

FOREIGN PATENTS

| | | |
|---|---|---|
| 679,562 | Great Britain | Sept. 17, 1952 |